United States Patent [19]

Franklin

[11] 4,020,691
[45] May 3, 1977

[54] D.C. SIGNAL CURRENTS IN CAPACITANCE GAGING SYSTEMS

[75] Inventor: Cecil Franklin, Shelburne, Vt.

[73] Assignee: Simmonds Precision Products, Inc., Tarrytown, N.Y.

[22] Filed: May 10, 1976

[21] Appl. No.: 684,834

Related U.S. Application Data

[62] Division of Ser. No. 432,242, Jan. 10, 1974, abandoned.

[52] U.S. Cl. .............................................. 73/304 C
[51] Int. Cl.² ......................................... G01F 23/26
[58] Field of Search ............. 73/304 R, 304 C, 313

[56] References Cited

UNITED STATES PATENTS

| 3,916,689 | 11/1975 | Donnaly | 73/304 C |
| 3,935,739 | 2/1976 | Ells | 73/304 C |

*Primary Examiner*—S. Clement Swisher
*Attorney, Agent, or Firm*—Edwin E. Greigg

[57] ABSTRACT

A signal transmission system responsive to A.C. signals has rectifier means arranged to receive the A.C. signals. The rectifier means are connected to first and second circuit paths so as to establish respective unidirectional currents of opposite polarity and dependent on the A.C. signals, in the two circuit paths. Integrating means are connected to at least one of the circuit paths to integrate the current therein to thereby produce an output signal dependent on the A.C. signal but independent of any stray A.C. pickup on either circuit path.

6 Claims, 1 Drawing Figure

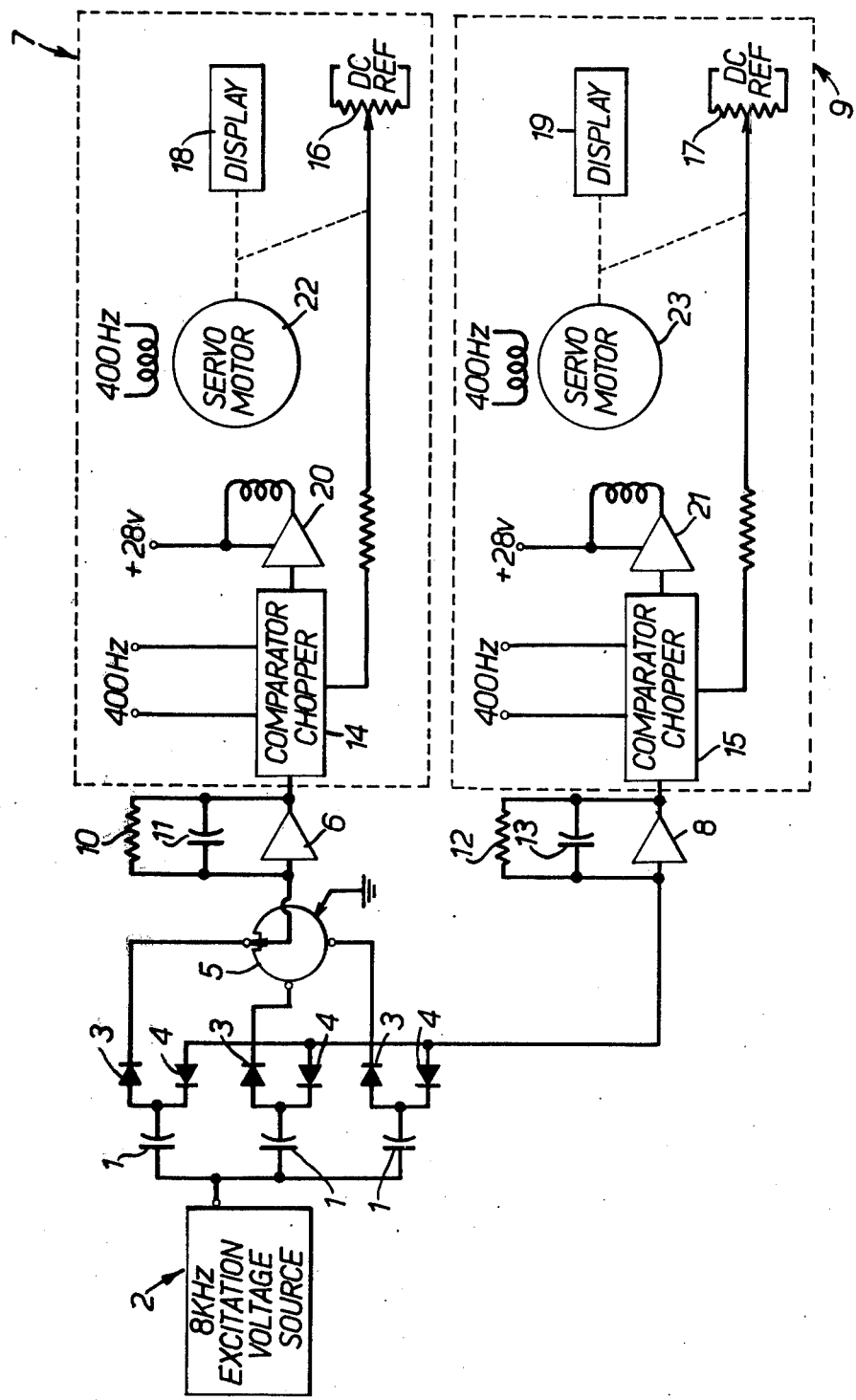

D.C. SIGNAL CURRENTS IN CAPACITANCE GAGING SYSTEMS

This is a division of application Ser. No. 432,242, filed Jan. 10, 1974, now abandoned.

BACKGROUND OF THE INVENTION

1. Field of the Invention

The invention relates to signal transmission systems responsive to A.C. signals.

2. Brief Description of the Prior Art

Known in the art are signal transmission systems for transmitting A.C. signals over a signal line in which the signal line is directly connected to the source of the A.C. signals. Such an arrangement suffers from the disadvantage that to avoid the possibility of false interpretation of signals received at the receiving end of the signal line due to spurious signals picked up by the signal line as a result of stray capacitive coupling and the like, either complex signal processing equipment must be used at the receiving end of the signal line, or the signal line must be shielded or made coaxial with its return line. These methods of avoiding misinterpretation of the received signals are expensive and reduce the overall system reliability.

It is an object of the invention to provide an improved signal transmission system. It is a further object of the invention to eliminate the need to shield the signal line or the need to employ complex signal processing equipment for avoiding misinterpretation of received signals due to A.C. pick up in the signal line.

SUMMARY OF THE INVENTION

According to the invention there is provided a signal transmission system responsive to A.C. signals, comprising first and second circuit paths, rectifier means connecting the first and second circuit paths to receive the A.C. signals so as to establish respective unidirectional currents of opposite polarity dependent on the A.C. signals in the two circuit paths, and integrating means connected to at least one said circuit path and integrating the current therein to produce an output signal dependent on the A.C. signals.

According to the invention there is also provided a data transmission system responsive to low value A.C. data signals, comprising a circuit path including an unshielded signal line and rectifier means for establishing unidirectional current flow therein, integrating means connected to integrate the rectifier signal in the said signal line to produce a D.C. output signal dependent thereon, and output means connected to receive and amplify the said D.C. signals.

According to the invention there is further provided an aircraft fuel contents measuring and display system, comprising a plurality of variable impedance type transducers each sensitive to the fuel content of a respective one of several aircraft fuel tanks, an A.C. energisation source for energising the transducers in parallel to produce A.C. signals dependent on the impedance of each transducer, a respective pair of rectifier means connected to each transducer and defining respective first and second circuit paths for the transducer which respectively carry unidirectional currents of opposite polarity both dependent on the A.C. signals of that transducer, first and second integrating means, selector means having inputs respectively connected to all the said first circuit paths and a single output for feeding any selected one of its inputs to the first integrating means to produce an output signal dependent on the fuel content sensed by the transducer feeding the selected one of the first circuit paths, and means additively connecting all the second circuit paths to the second integrating means to produce a second output signal dependent on the sum of the fuel contents sensed by all the said transducers.

BRIEF DESCRIPTION OF THE DRAWING

An aircraft fuel-level indicator system embodying the invention will now be particularly described by way of example only with reference to the accompanying drawing which is a block circuit diagram of the fuel-level indicator system.

DESCRIPTION OF THE PREFERRED EMBODIMENT

As shown in the Figure, the aircraft fuel-level indicator system comprises capacitance transducers 1, each arranged in a different fuel tank of the aircraft. The capacitance of each capacitance transducer 1 varies with the fuel level in its associated tank, the average dielectric constant of the transducer being dependent on the quantity of fuel in the tank. The tansducers 1 are arranged to be excited by an 8kHz constant amplitude excitation voltage source 2.

The output of each transducer 1 is connected to the anode of one diode 3 and to the cathode of another diode 4. These diodes are preferably silicon diodes mounted on a terminal assembly of each tank. Thus two output signal tones, one each from the diodes 3 and 4, are connected to each transducer 1. The signal lines from the cathodes of the diodes 3 are connected to a selector switch 5, which selectively connects each signal line in turn to a preamplifier 6 whose output is connected to an indicator channel 7 which indicates the fuel state in the fuel tank associated with the signal line. The other signal lines from the diodes 3 are grounded at that time. The signal lines from the anodes of the diodes 4 are connected together and connected to the input of a preamplifier 8 connected to an indicator channel 9 which indicates the total fuel state of all the fuel tanks.

The preamplifiers 6 and 8 are arranged to act as integrators by use of feed-back circuits comprising respectively a resistor 10 parallelled by a capacitor 11 and a resistor 12 parallelled by a capacitor 13. The preamplifiers 8 and 9 are advantageously integrated-circuit differential amplifiers having one input connected to the signal line from the diodes 3 or 4, and the other input (not shown) connected to the aircraft ground. The capacitors 11 and 13 are of a relatively large value to produce a steady D.C. voltage output from the preamplifiers 6 and 8.

The output from each preamplifier 6 and 8 is fed to a comparator-chopper unit 14 or 15 which effects a comparison between the output voltage of the associated preamplifier and the voltage appearing on the wiper of a rebalance potentiometer 16 or 17 of a display 18 or 19 of each indicator channel 7 or 9 respectively. Any error signal resulting from this comparison is chopped to produce a 400 Hz signal which is then fed to a driver amplifier 20 or 21 which drives a servo motor 22 or 23 of the display 18 or 19. The rebalance potentiometer is driven by the servo motor. The comparator-chopper units 14 and 15 advantageously employ transistors.

The indicator system operates as follows.

An 8kHz A.C. signal appearing at the output of a transducer 1 is split into two half sine wave D.C. signals. A selected one of the positive sine waves is fed via the selector switch 5 to the preamplifier 6, there the positive sine wave is integrated into a steady D.C. voltage output which is fed to the indicator channel 7 where it is compared with the wiper voltage of the rebalance potentiometer 16. The error signal then produced is chopped and used to drive the servo motor 22 to correctly set the display 18.

The negative half sine waves from all the transducers 1 are summed before being fed to the preamplifier 8, whose D.C. output is fed to the indicator channel 9 which operates in a manner similar to that of the indicator channel 7.

The transducer outputs have high impedances and only relatively small signals are produced. However, since the high impedance signal lines from the diodes 3 and 4, carry D.C. currents and feed the preamplifiers 8 and 9 acting as integrators, the signal lines are immune to stray A.C. currents which may be injected by capacitance coupling to other cables or from R.F. fields. Thus the signal lines need not be shielded as in conventional systems.

A excitation frequency for the transducers 1 of 8kHz is used in order to reduce the capacitive reactance of the transducers by an order of 20 times compared to that produced by the more normally used 400 Hz of conventional systems. This has the effect of providing a degree of immunity to the effects of fuel conductance resulting from an excess of anti-static additive or other contaminants in the fuel example.

The above described aircraft fuel-level indicator system is advantageous in that elmination of the need for shielding on the signal lines leads to an increased signal line reliability and a reduction in weight and cost. The above described system also readily provides two independent signal lines from each transducer for discrete fuel tank fuel state and total fuel state indications.

The arrangement of diodes connected to a line carrying an A.C. signal, to produce a D.C. signal that can be usefully carried on unshielded lines and later integrated to eliminate any stray A.C. signals picked up by the unshielded line, can be advantageously used in other applications where high impedances and low value current signals conventionally require the use of shielded or coaxial cables.

I claim:

1. An aircraft fuel contents measuring and display system, comprising a plurality of variable impedance type transducers each sensitive to the fuel content of a respective one of several aircraft fuel tanks, an A.C. energisation source for energising the transducers in parallel to produce A.C. signals dependent on the impedance of each transducer, a respective pair of rectifier means connected to each transducer and defining respective first and second circuit paths for that trandsucer which respectively carry unidirectional currents of opposite polarity both dependent on the A.C. signals of that transducer, first and second integrating means, selector means having inputs respectively connected to all the said first circuit paths and a single output for feeding any selected one of its inputs to the first integrating means to produce an output signal dependent on the fuel content sensed by the transducer feeding the selected one of the first circuit paths, and means additively connecting all the second circuit paths to the second integrating means to produce a second output signal dependent on the sum of the fuel contents sensed by all the said transducers.

2. A system according to claim 1, in which the A.C. energisation source is connected to produce an A.C. energistation output varying about a grounded datum point, the said first integrating means comprises a differential amplifier having one of its inputs connected to the output of the selector means and the other of its inputs grounded, the said second integrating means comprises another differential amplifier having one of its inputs connected to the additively connected second circuit paths and the other of its inputs grounded, each differential amplifier has a feed-back circuit including a parallel-connected capacitor and resistor, and the said selector means for grounding each unselected first circuit path.

3. A system according to claim 1, including, for each integrating means, respective power amplifier means for receiving and amplifying the said output signal of the integrating means, and display means responsive to the amplified output signal for displaying it.

4. A system according to claim 3, in which the display means comprises a mechanical indicator, and each power amplifying means comprises a servo motor connected to drive the mechanical indicator, means responsive to the instantaneous position of the mechanical indicator to produce an electrical feedback signal, comparing means for comparing the feedback signal with the respective said output signal to produce an error signal dependent on the difference, if any, therebetween, amplifying means connected to receive and power-amplify the said error signal, and means feeding the amplified error signal to energise the servo motor in a direction such as to minimize the value of the error signal.

5. A system according to claim 1, in which each transducer comprises a capacitor whose dielectric is formed at least in part by the fuel, whereby its capacitive impedance depends on the fuel contents.

6. A system according to claim 1, in which each first and second circuit path includes unshielded signal lines.

* * * * *